(12) United States Patent
Birk et al.

(10) Patent No.: US 10,157,273 B2
(45) Date of Patent: *Dec. 18, 2018

(54) EYE MOVEMENT BASED KNOWLEDGE DEMONSTRATION

(71) Applicant: INTEL CORPORATION, Santa Clara, CA (US)

(72) Inventors: Eran Birk, Haifa (IL); Shai Kavas, Mevasseret Zion (IL); Michal Jacob, Haifa (IL); Omer Ben-Shalom, Rishon Le-Tzion (IL)

(73) Assignee: Intel Corporation, Santa Clara, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/362,450

(22) Filed: Nov. 28, 2016

(65) Prior Publication Data
US 2017/0116404 A1   Apr. 27, 2017

Related U.S. Application Data

(63) Continuation of application No. 13/995,937, filed as application No. PCT/US2011/067143 on Dec. 23, 2011, now Pat. No. 9,519,768.

(51) Int. Cl.
G06K 9/00     (2006.01)
G06F 21/32    (2013.01)
G06F 21/36    (2013.01)

(52) U.S. Cl.
CPC .............. *G06F 21/32* (2013.01); *G06F 21/36* (2013.01); *G06K 9/00604* (2013.01); *G06K 9/00617* (2013.01)

(58) Field of Classification Search
CPC .......... G06K 9/00; A61B 5/00; G06T 7/0006; G06T 7/0004; G06T 7/001; G06T 2207/30121; G06T 2207/10024

(Continued)

(56) References Cited

U.S. PATENT DOCUMENTS 5,051,931 A   9/1991   Cheu
7,630,524 B2  12/2009  Lauper et al.

(Continued)

OTHER PUBLICATIONS

International Search Report and Written Opinion dated Sep. 25, 2012 for International Application No. PCT/US2011/067143, 11 pages.

(Continued)

*Primary Examiner* — Samir Ahmed
(74) *Attorney, Agent, or Firm* — Schwabe, Williamson & Wyatt, P.C.

(57) ABSTRACT

Embodiments of methods, apparatuses, and storage mediums associated with eye movement based knowledge demonstration, having a particular application to authentication, are disclosed. In embodiments, a computing device may determine whether a received input of a pattern of eye movements is consistent with an expected pattern of eye movements of a user when the user attempts to visually locate a piece of information embedded in a display. In embodiments, the expected pattern of eye movements may include patterns related to fixations and/or other statistical patterns, however, may not be limited to such patterns. In applications, determining consistency or correlation with the expected pattern of eye movements may identify the user by simultaneously verifying at least factors of authentication—that of biometric criteria related to a user's pattern of eye movements and a password or other information known to the user.

31 Claims, 4 Drawing Sheets

(58) Field of Classification Search
USPC .......... 382/115–118; 348/169–172; 351/209, 351/236
See application file for complete search history.

(56) References Cited

U.S. PATENT DOCUMENTS

| | | |
|---|---|---|
| 7,986,816 B1 * | 7/2011 | Hoanca .............. G06K 9/00892 |
| | | 382/115 |
| 8,977,972 B2 | 3/2015 | Anderson |
| 9,519,768 B2 * | 12/2016 | Birk ........................ G06F 21/36 |
| 2003/0076300 A1 | 4/2003 | Lauper et al. |
| 2006/0039686 A1 | 2/2006 | Soh et al. |
| 2010/0004023 A1 | 1/2010 | Jabri et al. |

OTHER PUBLICATIONS

International Preliminary Report on Patentability dated Jul. 3, 2014 for International Application No. PCT/US2011/067143, 9 pages.
Extended European Search Report dated Jul. 23, 2015 for European Application No. 11878202.8, 5 pages.

* cited by examiner

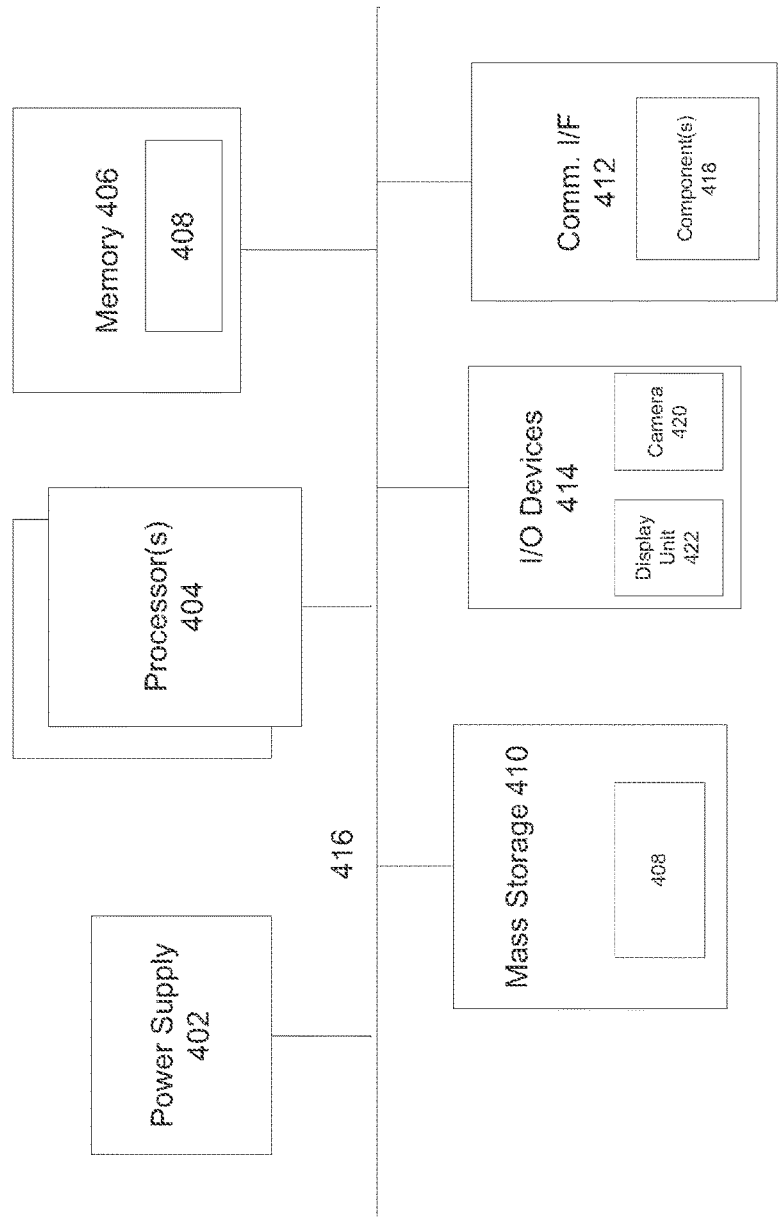

EYE MOVEMENT BASED KNOWLEDGE DEMONSTRATION

CROSS REFERENCE TO RELATED APPLICATIONS

The present application is a continuation of U.S. patent application Ser. No. 13/995,937, a national phase entry under 35 U.S.C. § 371 of International Application No. PCT/US2011/067143, filed Dec. 23, 2011, entitled "EYE MOVEMENT BASED KNOWLEDGE DEMONSTRATION", which designated, among the various States, the United States of America. The Specification of the PCT/US2011/067143 Application is hereby incorporated by reference. U.S. patent application Ser. No. 13/995,937 is now U.S. Pat. No. 9,519,768.

TECHNICAL FIELD

This disclosure relates generally to data processing. More particularly, but not exclusively, the present disclosure relates to an eye movement based knowledge demonstration, having a particular application to, for example, authentication.

BACKGROUND INFORMATION

The background description provided herein is for the purpose of generally presenting the context of the disclosure. Unless otherwise indicated herein, the materials described in this section are not prior art to the claims in this application and are not admitted to be prior art by inclusion in this section.

There are several different types of eye movements. Eye movements that allow us to quickly redirect our line of sight are referred to as saccades or saccadic eye movements. Saccades are rapid and ballistic eye movements that redirect and/or separate points of fixations, observations of a point in a visual field where the eye remains relatively still for a period of time. Fixations span about 2 degrees of the visual field, and include information which is processed with sharpness, clarity, and accuracy. In contrast, during saccades it does not appear that information is processed. Saccades, which include voluntary and involuntary changes in fixation, vary greatly in type and performance. In response to a stimulus such as light or a novel object, eye movements may include, for example, relatively slow or fast saccades, saccades that overshoot or undershoot a target or fixations, saccades with short or long latency, curved or straight saccades. Note that eye movements can distinguish between observers as well as have robustness within the observers. Thus, eye movements may remain consistent across different states of the same observer, e.g., fatigued, sober, or various other states.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a block diagram that illustrates an example computer system suitable to practice the disclosed method in accordance with embodiments.

DETAILED DESCRIPTION

Embodiments for a method, apparatus, and system for eye movement based knowledge demonstration, having a particular application to e.g., authenticating a user based upon two or more factors. In embodiments, the method may include determining by a routine on a computing device, whether a received input of a pattern of eye movements may be consistent with an expected pattern of eye movements of a user when the user attempts to visually locate a piece of information embedded in a display. In embodiments for authentication, determining consistency or correlation with the expected pattern of eye movements may identify the user by simultaneously verifying two factors of authentication—biometric criteria related to the user's eye movements as well as a password or other information previously known to the user. In embodiments, upon making the determination, the routine may generate a response to the input, based at least in part on whether the input is determined to be consistent with the expected pattern of eye movements. In embodiments, the response may indicate whether or not the user has demonstrated that the piece of information is previously known to the user. In embodiments for authentication applications, the response may indicate whether access to a resource, e.g., an application program, is to be granted or denied based on the determination. For ease of understanding, the remaining description will be presented substantially in the context of authentication, including eye movement based demonstration of knowledge of a password. The embodiments may be described in the context of a hidden or embedded password in a matrix or grid. It is noted that the description is not to be read as limiting, as other suitable configurations and/or applications are also contemplated. For example, patterns of eye movements of a user associated with detecting a graphical image hidden within another graphical image may be utilized instead.

In the following description, numerous specific details are given to provide a thorough understanding of embodiments. However, the embodiments can be practiced without one or more of the specific details, or with other methods, components, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
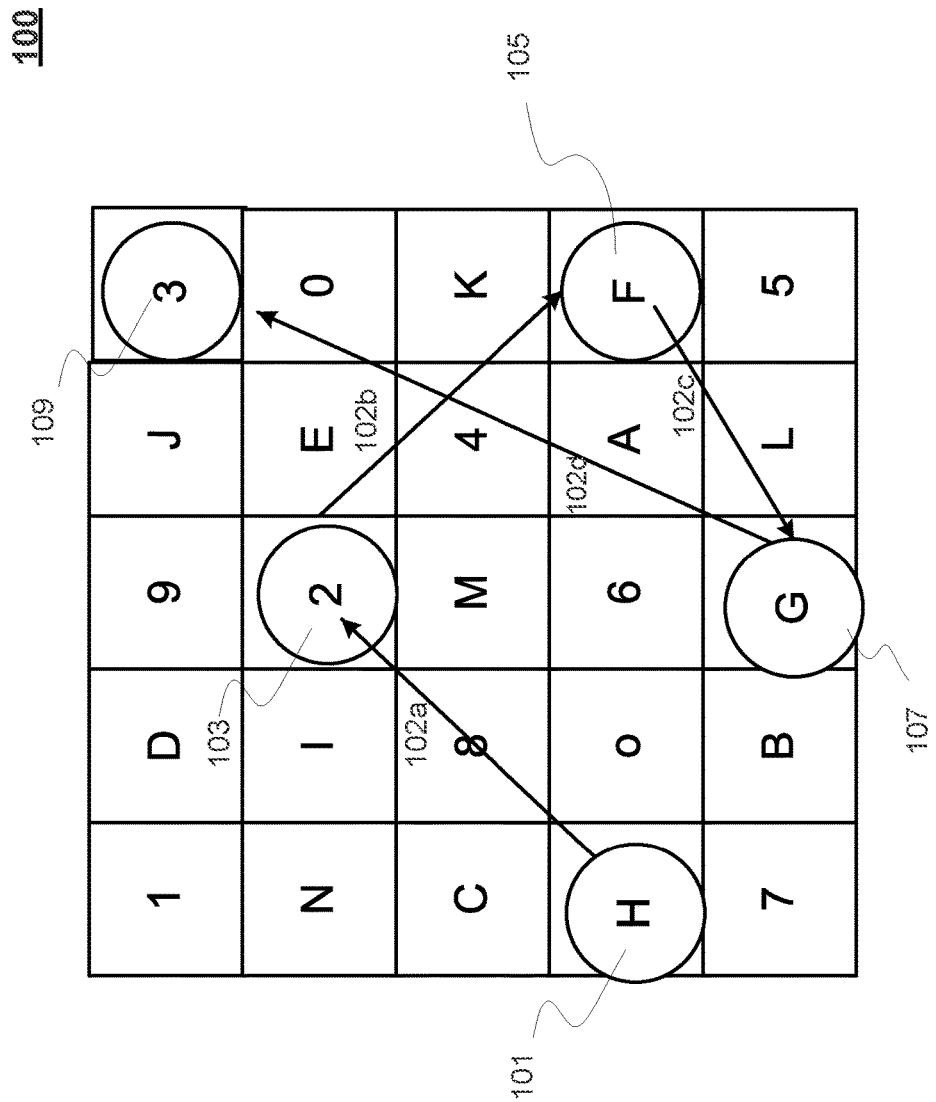
FIG. 1 illustrates an example of a display including a grid or matrix in which a piece of information potentially previously known to a user, e.g., a password, is embedded, in accordance with embodiments.

FIG. 1 illustrates a display 100 associated with eye movement based knowledge demonstration, in accordance with embodiments. In the illustrated embodiment, display 100 may be a grid or a matrix that includes a randomized pattern including various alphabetical and numerical characters. In embodiments, during a login attempt or other attempt by a user to gain access to a secure application, a camera or other device including a sensor may capture or record an input which may include a pattern of eye movements of the user when the user attempts to visually locate a piece of information embedded in display 100. In embodiments, the sensor may include not only sensors typical to those found in typical video or other cameras but sensors used for more specialized purposes, such as for example, infrared (IR) sensors. In embodiments, the piece of information is previously known to the user, e.g., a password or a portion of a password. As illustrated in FIG. 1, a password, "H2FG3," may be embedded within display 100. Accordingly, in the embodiment, a camera associated with a device of the user may record an eye movement scan path performed by the user along a hidden password path 102, which may be defined as a correct path between password characters. In embodiments, the randomized pattern may require search and detection of each character of the password in turn. For example, as fixations are made while detecting "H" at 101, "2" at 103, "F" at 105, "G" at 107, and "3" at 109, for embodiments, the camera may record various eye movements including but not limited to a unique number, length, type, and location of fixations and saccades and/or other movements along password path 102 along segments 102a, 102b, 102c and 102d. Note that eye movements along the hidden password path may not be limited to successive fixations on the password characters. Moreover, in embodiments, successive fixations may not be likely to occur successfully without interfering fixations. As will be discussed further below, an algorithm to infer meaningful fixations (those that fall on correct password characters in a correct order) may be applied.

In embodiments, recorded patterns of eye movements may serve as an input to a routine operating on a computing device. In embodiments, the routine may determine whether the recorded patterns of eye movement are substantially consistent with an expected pattern of movement that demonstrates prior knowledge of the embedded piece of information, e.g., by collecting and analyzing the data associated with the recorded pattern of eye movements. In various embodiments, the routine may not only match the password with a stored password but may collect and analyze statistics related to an entire pattern of eye movements initiated by stimulus in display 100. In embodiments, the statistics may be compared to unique statistics associated with patterns of eye movements of the user.

Various known algorithms related to analysis of eye movements may be employed for the analysis. For a description of the type of algorithms that may be used in determining the expected pattern of eye movements, please see for example, [Bednarik, Kinnunen, Mihaila & Fränti (2005), Eye-Movements as a Biometric. In H. Kalviainen et al. (Eds.): SCIA 2005, LNCS 3540, pp. 780-789, 2005]; [Kasprowski & Ober (2004), Eye Movements in Biometrics, In D. Maltoni and A. K. Jain (Eds.): BioAW 2004, LNCS 3087, pp. 248-258, 2004]. As noted previously, in embodiments, as long as certain parameters that may be unchanged have been identified, patterns of eye movements may allow a user to be identified regardless of various states of the user, e.g. fatigue, etc. In embodiments, the expected pattern of eye movements may correspond to a unique pattern of eye movements recorded during a registration/enrollment or update of a registration or enrollment process. In embodiments, a password such as "H2FG3" may be selected during the registration or enrollment process. In embodiments, the password selected may be a permanent password. In other embodiments, the password may be changed periodically. Note that in embodiments, a "pattern" may refer to a specific sequence of fixations in a search as well as to statistics related to eye movements concealed in the search.

Figure 2:
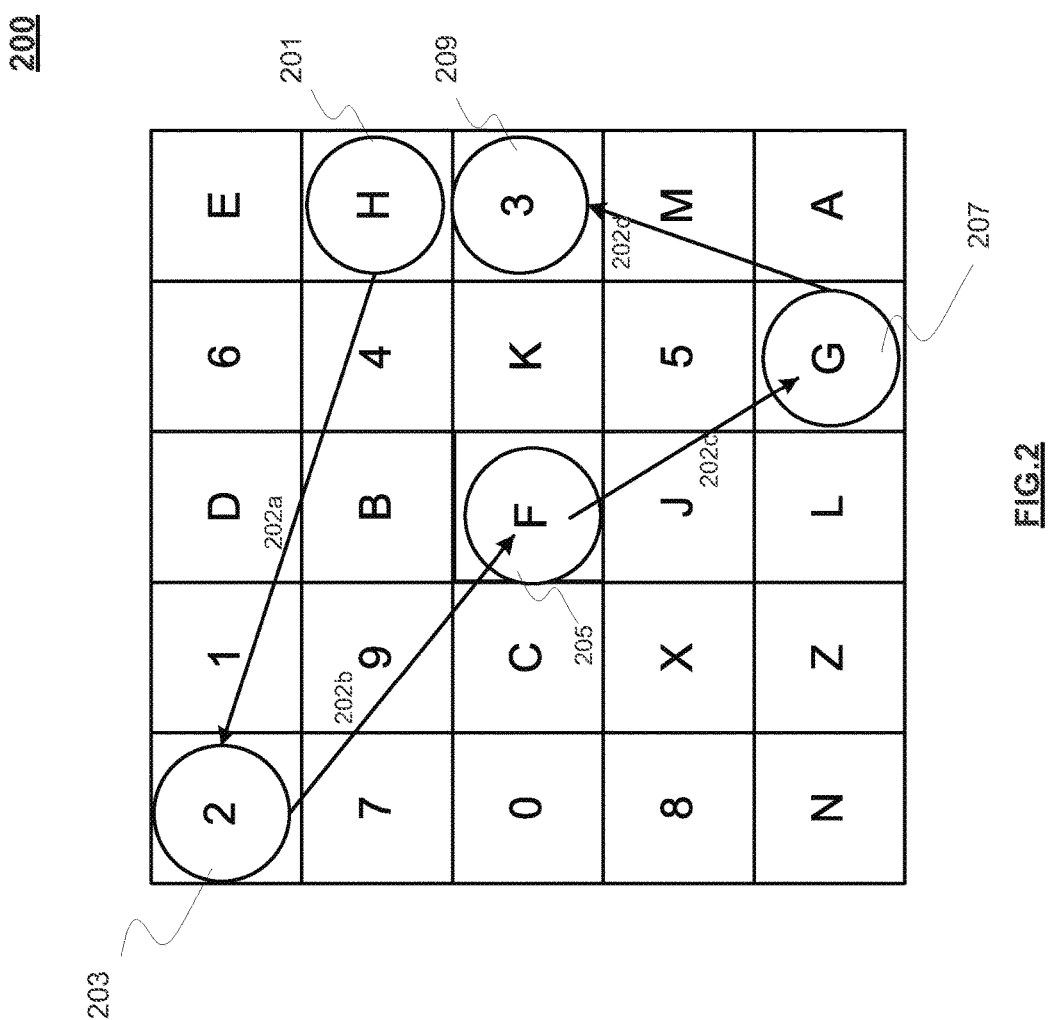
FIG. 2 illustrates a display in which characters in the grid or matrix of FIG. 1 have changed a location, in accordance with embodiments.

FIG. 2 illustrates that during a subsequent or next login attempt, stimulus in display 100 may be changed. Thus, in the embodiment, various alphabetical and numerical characters in display 100 may be dynamically allotted to appear in a different location. In addition, in embodiments, some or all of the alphabetical and/or numerical characters may be replaced by new alphabetical or numerical characters. Thus, as illustrated in display 200 of FIG. 2, password "H2FG3" may randomly change a location within a grid. In embodiments, the input of pattern of eye movements made by a user while detecting the password embedded in a different location in the display may not affect an ability to determine consistency or correlation with the expected pattern of eye movements. Thus, as illustrated in FIG. 2, rather than detecting "H" at 101, "2" at 103, "F" at 105, "G" at 107, and "3" at 109, a pattern of eye movements for the password "H2FG3" may be associated with detecting "H" at 201, "2" at 203, "F" at 205, "G" at 207, and "3" at 209. Thus, in embodiments, each time the user logs into his or her account or attempts to gain access to a secured resource, e.g., an secured application, his or her password may be hidden in a different location and/or within a different display of alphabetical and/or numerical characters.

Figure 3:
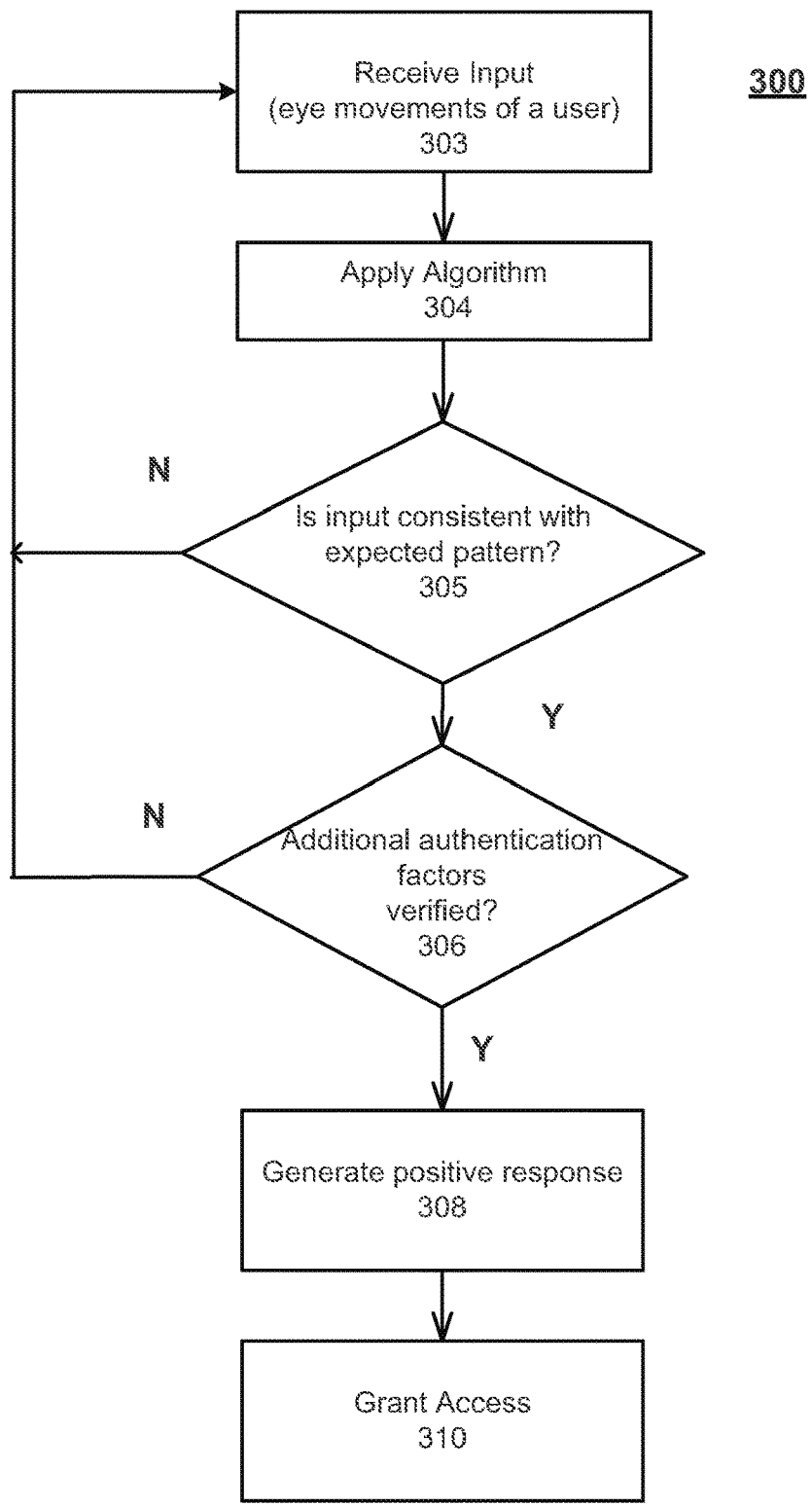
FIG. 3 is a flow diagram further illustrating the method of FIGS. 1 and 2.

The methods of FIGS. 1 and 2 may be further illustrated in a simplified flow diagram 300 of FIG. 3. In the embodiment shown, beginning at a block 303, a routine on a computing device may receive an input of a pattern of eye movements by a user, e.g., for requesting access to a resource, such as an application. In embodiments, any suitable video camera or other device including a sensor may be used to capture or record the pattern of eye movements by the user. Such cameras may include webcams or other digital cameras included in computing devices such as, for example, laptops, desktop computers, tablets, game consoles, as well as mobile devices including cell phones, smart phones, or personal digital assistants (PDAs). In various embodiments, cameras may include infrared cameras and/or light emitting diodes (LED) as well as integrate professional eye trackers. Note that in embodiments, a low resolution camera may be sufficient to capture the pattern of eye movements. Furthermore, note that for the embodiment, the input may be received at a client-side computing device or a remote computing device associated with a backend.

After input is received at block 303, for the embodiment, the routine may apply an algorithm at a block 304 for inferring a meaningful pattern of eye movements associated with a password path. In embodiments, the routine may employ various algorithms known in the field to determine whether the received input pattern of eye movements is consistent with the expected pattern of eye movements for one or more particular displays. Accordingly, the routine may use the algorithm to analyze whether the input comprises a pattern of eye movements that is consistent with an expected pattern of eye movements of a user when the user attempts to visually locate a known piece of information embedded in a display. As noted above, by determining that the input is consistent with the expected pattern, the routine may also determine that the user has demonstrated that the piece of information is previously known to the user. In embodiments, the routine may derive statistics such as a type and frequency of various eye movements associated with the user's pattern of eye movements. As noted above, in embodiments, the expected pattern of eye movements as well as the piece of information, e.g., password and/or personal identification number (PIN) may be previously determined, e.g., during an enrollment or registration session. For example, during the enrollment session, a selected password or PIN may be highlighted within a sample display while the user detects the password/PIN. In embodiments, the user's pattern of eye movements as she detects the password/PIN may be recorded and analyzed in order to establish the expected pattern of eye movements for various displays associated with future login attempts. In embodiments, a joint password by two users may be shared if both users input their respective patterns of eye movements at enrollment.

Thus, returning to flow diagram 300, at decision block 305, for the embodiment, if the input is determined to be consistent with the expected pattern of eye movements, the answer is YES and the flow may move to a next decision block 306. At decision block 306, in embodiments for authentication, the routine may determine whether or not additional authentication factors may be verified. For example, in embodiments, a device password may be associated with a computing device from which the user transmits her request and/or from which she records her eye movements. If this device password, which may in embodiments be a one-time-password "OTP," embedded in a firmware or a chipset, is determined to be the correct device password, then the answer at 306 may be YES and the flow may proceed to block 308 where the routine may generate a positive response, informing the user that access to a resource, such as an application program may be granted. Accordingly, at a next block 310, for the authentication embodiments, access to the resource may be granted. Note that an order of events as shown in flow diagram 300 may vary. For example, in various embodiments, the additional authentication factors can be verified in parallel, rather than sequentially as shown.

Note that for the embodiment, if at decision block 305 it was determined that the input is not consistent with the expected pattern of eye movements, the routine may return to block 303 where the user may repeat an attempt to input a pattern of eye movements. If the input is consistent with the expected pattern of eye movements, at a next block 306, for authentication embodiments, additional authentication factors may be verified. For the authentication embodiments, if the device password associated with the user does not match a correct device password, the flow may return to a block 303, where another iteration of flow diagram 300 may begin. If, however, the device password does match the correct device password, the flow may proceed to respective blocks 308 and 310 where a positive response may be generated accompanied and/or followed by access to the application. Note that in some embodiments, results related to analysis of the pattern of eye movements may be ignored in certain circumstances or authentication based on the pattern of eye movements may be offered as an alternative to verification of additional authentication factors (not shown).

Thus, as described above, embodiments may rely on changing a stimulus in a display at each login attempt. Accordingly, embodiments may include an analysis of patterns of eye movements rather than a fixed pattern. Thus, embodiments may offer enhanced security as compared to, for example, iris-scans or fingerprints in which criteria remains constant. In embodiments, because patterns of eye movements may be involuntary and unintentional, even if a password is compromised, another user may not succeed in replicating the user's patterns of eye movements. In the embodiments described above, patterns of eye movements may provide robust identity verification due to changing input.

Furthermore, in various embodiments, the routine may be configured to cause the processor to validate a one-time-password associated with a second computing device from which the input is received. For the embodiment, the user may be authenticated, based in part on the validating of the one-time-password as well as on the determining of whether the input is consistent with an expected pattern of eye movements of a user.

Note that in embodiments, information related to the expected pattern of eye movements of the user may be encrypted and stored in the cloud. In embodiments, the user may be able to gain access to resources via an authentication method as described above on any suitable computing device that may have an ability to capture and record the user's pattern of eye movements. Note that embodiments offer improved privacy for users as even if information related to the expected pattern of eye movements were to be stolen, the information cannot be used to fake or impersonate the user's identity.

Embodiments of multi-factor authentication related to eye pattern movements of a user may be used in a number of implementations and applications. FIG. 4 is a block diagram that illustrates an example computer system 400 suitable to practice the method of various embodiments.

As shown, computer system 400 may include a power supply unit 402, a number of processors or processor cores 404, a memory 406 having processor-readable and processor-executable instructions 408 stored therein, a mass storage device 410 that may also store the instructions 408, and a communication interface 412 including components 418. For the purpose of this application, including the claims, the terms "processor" and "processor cores" may be considered synonymous, unless the context clearly requires otherwise. In embodiments, the computer system 400 may also comprise input/output (I/O) devices 414 such as including a digital camera 420 and a display unit 422. I/O devices 414 may also include a keyboard, cursor control, and so forth. In various embodiments, digital camera 420 may include a sensor that may be configured to capture and/or record eye pattern movements of a user as described in accordance with FIGS. 1-3. In various embodiments, the sensor may include an integrated professional eye-tracker.

In embodiments, display unit 420 may be configured to render a randomized pattern such as for example as shown in display 100 and 200 of FIGS. 1 and 2. In embodiments, a piece of information detected by the user may include a password but may also include a graphical image such as, for example, a symbol, shape, or picture. In various embodiments, a display rendered on display unit 420 may be a firmware-based display that may rendered directly from firmware. In embodiments, information associated with the display may not be exposed to a host operating system of the computer system 400. Thus, in embodiments, a secured display may include a one-time display which may defeat an ability of malware running on a host operating system (OS) level to record characters being observed.

In various embodiments of the present disclosure, at least one of the processors 404 may be coupled to receive an input of the eye movements pattern of the user and may include logic configured to determine whether the input comprises a pattern of eye movements that is consistent with an expected pattern of eye movements of a user, when the user attempts to visually locate a piece of information embedded in a display, demonstrating that the piece of information is previously known to the user. In embodiments, the logic may make the determination by matching the input against a known pattern stored in the memory 406. In embodiments, the logic may also calculate ad hoc an expected pattern associated with the particular display to which the input may be matched. In embodiments, the logic may cause computer system 400 to authenticate the user and/or generate a response indicating that he user has been authenticated.

The one or more mass storage devices 410 and/or the memory 406 may comprise a tangible, non-transitory computer-readable storage device (such as a diskette, hard drive, compact disc read only memory (CDROM), hardware storage unit, and so forth). Such component(s) 418 may alternatively or additionally be located elsewhere in the computer system 400, and may comprise part or all of an integrated circuit.

The various elements of FIG. 4 may be coupled to each other via a secured communication pathway 416, which may represent a multi-drop bus or a point-to-point interconnect. In the case of multiple buses, they may be bridged by one or more bus bridges (not shown). Data may pass through the system bus 416 through the I/O devices 414, for example, between the component(s) 418 and the processors 404. The memory 406 and the mass storage device 410 may be employed to store a working copy and a permanent copy of the programming instructions implementing firmware modules or drivers.

The remaining constitution of the various elements of the computer system 400 is known, and accordingly will not be further described in detail. The above description of illustrated embodiments, including what is described in the Abstract, is not intended to be exhaustive or to be limited to the precise forms disclosed. While specific embodiments and examples are described herein for illustrative purposes, various modifications are possible. For example, the order of operations of flow diagram 300 of FIG. 3 has been presented only as an example. In other embodiments, a different order of operations and/or various processes may be omitted or added in the spirit of the embodiments. These and other modifications can be made in light of the above detailed description. The terms used in the following claims should not be construed to be limited to the specific embodiments disclosed in the specification.

What is claimed is:

1. A computer system comprising:
   a sensor to generate sensor data representative of eye movements by a user;
   one or more processors;
   memory; and
   one or more mass storage devices to store instructions that, when executed by at least one processor of the one or more processors, cause the at least one processor to perform operations comprising:
   cause display of a plurality of characters in an arrangement on a display, wherein the plurality of characters include characters that are in a predetermined sequence of characters and characters that are not in the predetermined sequence of characters,
   determine whether a pattern of eye movements by a user in an attempt to visually locate the predetermined sequence of characters on the display is consistent with a predetermined pattern of eye movements, based at least in part on the sensor data generated by the sensor while the user is attempting to visually locate the predetermined sequence of characters on the display, and
   grant or deny access to one or more resources based at least in part on the determination.

2. The computer system of claim 1, wherein the plurality of characters includes alphabetic and/or numeric characters.

3. The computer system of claim 1, wherein the arrangement is a matrix of rows and columns.

4. The computer system of claim 1, wherein the predetermined pattern of eye movements includes eye fixations.

5. The computer system of claim 1, wherein the determination includes comparison of statistics related to the pattern of eye movements by the user in the attempt to visually locate the predetermined sequence of characters on the display with statistics related to the predetermined pattern of eye movements.

6. The computer system of claim 1, wherein the instructions, when executed by the at least one processor, cause the at least one processor to perform the causation of display and the determination as part of a user login attempt.

7. The computer system of claim 1, wherein the operations comprise:
   cause recordation of the predetermined pattern of eye movements as part of a registration or an enrollment.

8. The computer system of claim 1, wherein the computer system comprises the one or more resources.

9. The computer system of claim 1, wherein the computer system comprises the display.

10. The computer system of claim 1, comprising a camera, wherein the sensor is part of the camera.

11. The computer system of claim 1, wherein the sensor comprises an infrared sensor.

12. At least one non-transitory computer readable storage medium having a plurality of instructions that, when executed by a computer system having a sensor generate sensor data representative of eye movements by a user, result in operations comprising:
    display a plurality of characters in an arrangement on a display, wherein the plurality of characters include characters that are in a predetermined sequence of characters and characters that are not in the predetermined sequence of characters;
    determine whether a pattern of eye movements by the user in an attempt to visually locate the predetermined sequence of characters on the display is consistent with a predetermined pattern of eye movements, based at least in part on the sensor data generated by the sensor while the user is attempting to visually locate the predetermined sequence of characters on the display; and
    grant or deny access to one or more resources based at least in part on the determination.

13. The at least one non-transitory computer readable storage medium of claim 12, wherein the plurality of characters includes alphabetic and/or numeric characters.

14. The at least one non-transitory computer readable storage medium of claim 12, wherein the arrangement is a matrix of rows and columns.

15. The at least one non-transitory computer readable storage medium of claim 12, wherein the predetermined pattern of eye movements includes eye fixations.

16. The at least one non-transitory computer readable storage medium of claim 12, wherein the determination includes comparison of statistics related to the pattern of eye movements by the user in the attempt to visually locate the predetermined sequence of characters on the display with statistics related to the predetermined pattern of eye movements.

17. The at least one non-transitory computer readable storage medium of claim 12, wherein the instructions, when executed by the computer system, result in performance of the display and the determination as part of a user login attempt.

18. The at least one non-transitory computer readable storage medium of claim 12, wherein the operations comprise:
record the predetermined pattern of eye movements as part of a registration or an enrollment.

19. The at least one non-transitory computer readable storage medium of claim 12, wherein the computer system comprises the one or more resources.

20. A method comprising:
causing, by a computer system, display of a plurality of characters in an arrangement on a display, wherein the plurality of characters include characters that are in a predetermined sequence of characters and characters that are not in the predetermined sequence of characters;
generating, by a sensor of the computer system, sensor data representative of a user's eye movement in an attempt to visually locate the predetermined sequence of characters on the display;
determining, by the computer system, whether a pattern of eye movements by the user in the attempt to visually locate the predetermined sequence of characters on the display is consistent with a predetermined pattern of eye movements, based at least in part on the sensor data generated by the sensor while the user is attempting to visually locate the predetermined sequence of characters on the display; and
granting or denying, by the computer system, access to one or more resources based at least in part on the determination.

21. The method of claim 20, wherein the plurality of characters includes alphabetic and/or numeric characters.

22. The method of claim 20, wherein the arrangement is a matrix of rows and columns.

23. The method of claim 20, wherein the predetermined pattern of eye movements includes eye fixations.

24. The method of claim 20, wherein the determining includes comparing statistics related to the pattern of eye movements by the user in the attempt to visually locate the predetermined sequence of characters on the display with statistics related to the predetermined pattern of eye movements.

25. The method of claim 20, comprising:
capturing, by a sensor of the computer system, eye movements by the user in the attempt to visually locate the predetermined sequence of characters on the display.

26. A computer system comprising:
sensor means for generating sensor data representative of a user's eye movement in an attempt to visually locate a predetermined sequence of characters on a display;
means for causing display of a plurality of characters in an arrangement, wherein the plurality of characters include characters that are in a predetermined sequence of characters and characters that are not in the predetermined sequence of characters;
means for determining whether a pattern of eye movements by the user in the attempt to visually locate the predetermined sequence of characters is consistent with a predetermined pattern of eye movements, based at least in part on the sensor data generated by the sensor means while the user is attempting to visually locate the predetermined sequence of characters on the display; and
means for granting or denying access to one or more resources based at least in part on the determination.

27. The computer system of claim 26, wherein the plurality of characters includes alphabetic and/or numeric characters.

28. The computer system of claim 26, wherein the arrangement is a matrix of rows and columns.

29. The computer system of claim 26, wherein the predetermined pattern of eye movements includes eye fixations.

30. The computer system of claim 26, wherein the means for determining includes means for comparing statistics related to the pattern of eye movements by the user in the attempt to visually locate the predetermined sequence of characters with statistics related to the predetermined pattern of eye movements.

31. The computer system of claim 26, comprising:
means for capturing eye movements by the user in the attempt to visually locate the predetermined sequence of characters.

* * * * *